United States Patent Office 3,632,690
Patented Jan. 4, 1972

3,632,690
SUBSTITUTED 4,5-BENZO-1,3,2-DIOXA-PHOSPHOLANE
James L. Dever, Lewiston, and James J. Hodan, Williamsville, N.Y., assignors to Hooker Chemical Corporation, Niagara Falls, N.Y.
No Drawing. Filed Aug. 31, 1967, Ser. No. 664,603
Int. Cl. C07d *105/04;* C08f *45/58*
U.S. Cl. 260—937                           5 Claims

ABSTRACT OF THE DISCLOSURE

Compounds of the formula:

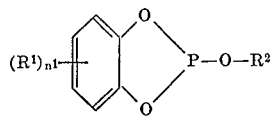

in which $R^2$ is selected from the group consisting of aryl and substituted aryl, in which $R^1$ is selected from the group consisting of alkyl, substituted alkyl, aryl, and substituted aryl, for example, and in which $n^1$ is from 0 to 4. Where $n^1$ is more than 1, the multiple substituents may be either the same or different. Compounds of this invention are useful as stabilizers against degradation of polymers such as polypropylene, polyethylene, various copolymers thereof, and the like. Additionally, a compound of this type is suitable for use as an intermediate in the synthesis of more complicated compounds.

---

This invention relates to a novel process for producing a novel compound especially suitable for use as a polymer stabilizer, and/or as a chemical intermediate.

BACKGROUND

In recent years, major advances have been made in the efficient production of dihydroxy phenols and substituted dihydroxy phenols. Accordingly, there is a continuing search for novel and useful compounds that can be prepared from dihydroxy phenols.

Prior art patents and other references such as U.S. Pat. 2,744,128 require the presence of an HCl acceptor, in order to produce tertiary phosphites. Also, see U.S. Pat. 3,172,871. The following literature references should serve to illustrate this point, and serve to illustrate the normally expected reactions.

(1) Two moles of an alcohol may be reacted with $PCl_3$ to produce the phosphorochloridite;

$$2ROH + PCl_3 \rightarrow (RO)_2PCl + 2HCl$$

Ref: W. Gerrard, J. Chem. Soc., 1944, 85. However, if this intermediate is then reacted with a third mole of alcohol in the absence of an HCl acceptor, one obtains the secondary phosphite (pentavalent) rather than the tertiary phosphite (trivalent):

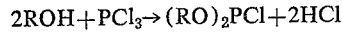

Ref: U.S. Pat. 2,864,847.

(2) It may be further stated that the reaction of $PCl_3$ with three moles of alcohol produces the secondary rather than the tertiary phosphite:

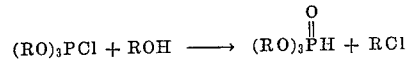

Ref: (a) T. Milobendzki & A. Sachnowski, Chem. Polski, 15 34 (1917); (b) British Pat. 778,077 (1954); and (c) H. McCombre et al., J. Chem. Soc. 1945, 380.

For U.S. 3,172,871, particularly column 2, lines 32-34 and column 6, line 28, although there is no mention of an acid acceptor, columns 7 and 8 of the patent give experimental conditions used to prepare the compounds of this patent and in all cases a hydrogen chloride acceptor, i.e., triethylamine, was employed. Additionally, column 8, lines 18–21 indicate that a hydrogen chloride acceptor was used in all cases for the preparation of the compounds cited. It may be further stated that the failure to use an acid acceptor would have led to products other than those indicated in the patent. This is substantiated by the references previously cited.

Trivalent phosphorus esters of o-dihydroxyphenol are desirable because of their outstanding thermal and hydrolytic stability.

Accordingly, an object of this invention is a novel process for producing a phosphorus aromatic ester of o-dihydroxyphenol.

Another object is a novel ester of o-dihydroxyphenol, typically characterized by good thermal and hydrolytic stability.

Other objects become apparent from the preceding and following disclosure.

THE INVENTION

The objects of this invention are obtained by a novel process for producing a compound, comprising heating a phenolic to from about 50° C. to about 250° C., preferably about 130° C. to about 180° C. and promptly thereafter adding, in the substantial absence of an acid acceptor, (i.e., a hydrogen halide acceptor), about an equimolar amount of typically 4,5 - benzo-2-halo-1,3-dioxa-2 - phospholane, or a substituted form thereof, while maintaining the temperature in the above-identified range. At temperatures above about 180° C., a higher degree of degradation occurs in direct proportion to increase in temperature. When a phenolic reactant having a relatively low boiling point is employed, a lower reaction temperature should be employed. After addition of the phospholane, in this process, the reaction temperature is preferably maintained until reaction is substantially complete as evidenced by cessation of the evolution of hydrogen chloride. After an appropriate reaction period of about 1 to about 10 hours, preferably about 2 to about 3 hours, the mixture consists of essentially pure novel compound of this invention. If higher purity is required the reaction product may be distilled under vacuum. This process is advantageous in that it does not require the use of a base, requires no refrigeration, uses about equimolar amounts of reactants, and proceeds in high conversions. In the novel process of this invention, it is critical that the reaction be carried out in the substantial absence of an acid acceptor.

The novel process described above may employ any phospholane of the formula:

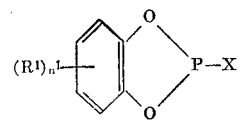

is reacted with a phenolic compound of the formula $R^2$—OH, preferably a phenol or substituted phenol of the formula:

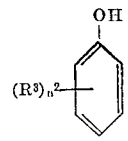

whereby the novel phosphorus aromatic ester is produced of the formula:

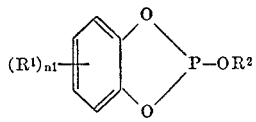

in which X is a halogen, preferably selected from the group consisting of chlorine, bromine and iodine, in which $R^2$ is selected from the group consisting of aryl, and substituted aryl, in which $R^1$ and $R^3$ are each selected from the group consisting of alkyl, substituted alkyl, aryl, and substituted aryl, for example, and in which $n^1$ and $n^2$ are each from 0 to 4. Where $n^1$ or where $n^2$ either are more than 1, the multiple substituents may be either the same or different. A compound of this general type is highly suitable for use as an intermediate in the synthesis of more complicated compounds.

The above compounds of the resulting formula are effective stabilizers for polymers such as polypropylene, polyethylene, acrylonitrile-butadiene-styrene copolymer, polystyrene, and other like compounds.

The alkyl substituent for $R^1$ and $R^3$ values may be any conventional aryl or conventional alkyl such as, alkyl of 1 to 12 carbon atoms, such as, methyl, ethyl, propyl, butyl, pentyl, hexyl, decyl, dodecyl, and the like preferably lower alkyl.

Typical aryls referred to above include phenyls, substituted phenyl, polycyclic phenyls, naphthyls, substituted forms thereof, and the like.

Typical compounds representative of the compounds of the above generic formula produced by the process of this invention typically include:

2-phenoxy-4,5-benzo-1,3,2-dioxa-phospholane;
2-(nonylphenoxy)-4,5-benzo-1,3,2-dioxa-phospholane;
2-(p-t-butylphenoxy)-4,5-benzo-1,3,2-dioxa phospholane;
2-(2,6-di-isopropylphenoxy)-4,5-benzo-1,3,2-dioxaphospholane;
2-(2,4-di-t-butylphenoxy)-4,5-benzo-1,3,2-dioxa-phospholane;
2-(2,6-dimethylphenoxy)-4,5-benzo-1,3,2-dioxa-phospholane;
2-[(1-phenylethyl)phenoxy]-4,5-benzo-1,3,2-dioxa-phospholane;
2-(2,6-di-sec-butylphenoxy)-4,5-benzo-1,3,2-dioxa-phospholane;
2-(2,4-di-sec-amylphenoxy)-4,5-benzo-1,3,2-dioxa-phospholane; and
2-(octylphenoxy)-4,5-benzo-1,3,2-dioxaphospholane;
2-(3,5-di-t-butylphenoxy)-4,5-benzo-1,3,2-dioxa-phospholane,
and the like.

The following examples are intended to illustrate the invention and do not limit the invention except to the extent that the appended claims are limited or as otherwise stated. In the following examples, all percentages are by weight, and temperatures are expressed in degrees centigrade unless otherwise stated.

The following Examples I–X illustrate the use of the compounds of this invention as stabilizers for polypropylene. This data was obtained using a Brabender Plasticorder which is widely accepeted in the plastics industry as a laboratory duplication of plastics plant processing. This instrument graphs changes in torque of a polymer melt with time under processing conditions. The torque is directly related to the viscosity of the polymer melt. Changes in viscosity have long been used as an indication of degradation of polymers. When degradation occurs by cross-linking the viscosity and torque increase with degradation and when degradation occurs by chain breaking, the viscosity and torque decrease with degradation. In the case of polypropylene, which was evaluated in this particular case, the torque decreases with degradation as evidenced by the values indicated in the attached table of results where no stabilizer was added. Initially, the torque dropped to 105 m.-g. All the readings in the table are 15 was 760 meter-grams and after fifteen minutes had minute readings because they offered the most convenient comparison point with unstabilized polypropylene. All values in the table were obtained using an EH.6 measuring head with mixing set at 100 r.p.m. and a bowl temperature of 190° C. The stabilizer was added at a 1% load level to unstabilized polypropylene and the mixture pre-blended before introduction to the mixing bowl. See Table I below.

TABLE I.—STABILIZATION OF POLYPROPYLENE WITH

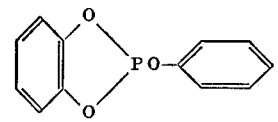

| Value of R | 15 minute torque reading (m.-g.) |
|---|---|
| Example No.: | |
| I — No stabilizer | 105 |
| II — –⟨phenyl with CHC₆H₅/CH₃⟩ | 580 |
| III — –⟨phenyl with CH₃CHC₂H₅⟩ | 755 |
| IV — –⟨phenyl with CH₃CHC₂H₅⟩–C₉H₁₉ | 850 |
| V — –⟨phenyl⟩–C(CH₃)₃ | 630 |
| VI — –⟨phenyl with CH(CH₃)₂⟩ | 800 |
| VII — –⟨phenyl with CH(CH₃)₂⟩ | 540 |
| VIII — –⟨phenyl with C(CH₃)₃⟩–C(CH₃)₃ | 770 |
| IX — –⟨phenyl with CH₃/CH₃⟩ | 510 |
| X — –⟨phenyl with CH(CH₃)₂/CH(CH₃)₂⟩ | 770 |

Examples XI through XIX illustrate the preparation of novel compounds by the novel process of this invention.

EXAMPLE XI 4,5-benzo-2-phenoxy-1,3,1-dioxaphospholane

A 500 ml. flask was charged with 94.1 g. (1.0 mole) of phenol which was heated to 155° C. under $N_2$. Then 174.5 g. (1.0 mole) of 4,5-benzo-2-chloro-1,3,2-dioxaphospholane was added dropwise in 0.1 hour at 150–160° C. When addition was over the mixture was heated 0.5 hour at 180° C., cooled under vacuum and distilled to give 208.9 g. (90% conversion) of clear, colorless product B.P. 85–86°, about 0.18 mm., $N_d^{25}$ 1.5771.

EXAMPLE XII 2,(2,4-di-sec-butylphenoxy)-4,5-benzo-1,3 2-dioxaphospholane

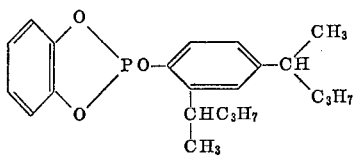

A 500 ml. flask was charged with 164.1 g. (0.7 mole) of 2,4-di-sec-amylphenol. This was heated to 155° C. under nitrogen and then 121.2 g. (0.7 mole) of 4,5-benzo-2-chloro-1,3,,21dioxaphospholane was added dropwise in 0.35 hour at 155–160° C. After heating one hour at 160°, the mixture was cooled under vacuum and distilled to give 241.8 g. (93% conversion) of clear, colorless product, B. P. 141–144° C., about 0.1 mm., having the following analysis.

Analysis.—Calc'd for $C_{22}H_{29}O_3P$ (percent): C, 71.0; H, 7.8; P, 8.3. Found (percent): C, 70.9; H 8.0; P. 8.2.

EXAMPLE XIII 2-(1-phenylethyl phenoxy)-4,5-benzo-1,3,2-dioxaphospholane

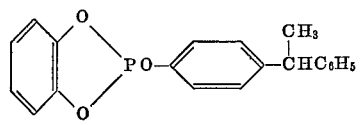

A 500 ml. flask was charged with 158.6 g. (0.8 mole) of monostyrenated phenol. This was heated to 153° C. under $N_2$ and then 139.6 g. (0.8 mole) of 4,5-benzo-2-choloro-1,3,2-dioxaphospholane was added dropwise in 0.5 hour at 155–160° C. After heating an additional hour at 160°, the mixture was cooled under vacuum and distilled to give 233 g. (87% conversion) of clear, colorless product B.P. 157–164° C., about 0.1 mm., having the following analysis.

Analysis.—Calc'd for $C_{20}H_{17}O_3P$ (percent): C, 71.4; H, 5.1; P, 9.2. Found (percent): C, 71.5; H, 5.2; P 9.2.

EXAMPLE XIV 2-(2,6-di-iso-propylphenoxy)-4,5-benzo-1,3,2-dioxaphospholane

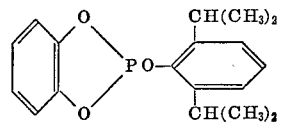

A 500 ml. flask was charged with 142.6 g. (0.8 mole) of 2,6-di-iso-propylphenol. This was heated to 155° C. under $N_2$ and 139.6 g. (0.8 mole) of 4,5-benzo-2-chloro-1,3,2-dioxaphospholane was added dropwise in 0.7 hour at 155–160° C. After heating an additional hour at 160° C., the mixture was cooled under vacuum and distilled to give 231.2 g. (91% conversion) of clear, colorless product, B.P. 118–121° C., about 0.2 mm., having the following analysis.

Analysis.—Calc'd for $C_{18}H_{21}O_3P$ (percent): C, 68.4; H 6.7; P, 9.8. Found (percent): C, 68.3; H, 6.7; P, 9.8.

EXAMPLE XV 2-(2,6-di-sec-butylphenoxy)-4,5-benzo-1,3,2-dioxaphospholane

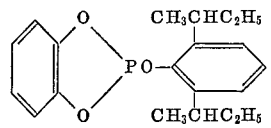

A 500 ml. flask was charged with 153.2 g. (0.75 mole) of 2,6-di-sec-butylphenol. This was heated to 155° C. under $N_2$ and then 130.9 g. (0.75 mole) of 4,5-benzo-2-chloro-1,3,2-dioxaphospholane was added dropwise in 0.4 hour at 150–160° C. After heating an additional hour at 160° C., the mixture was cooled under vacuum and distilled to give 238.6 g. (93% conversion) of clear, colorless product, B.P. 131–133° C., about 0.18 mm., having the following analysis.

Analysis.—Calc'd for $C_{20}H_{23}O_3P$ (percent): C, 70.1; H, 6.8; P, 9.0. Found (percent): C, 70.0; H, 6.9; P 9.1.

EXAMPLE XVI 2-(3,5-di-t-butylphenoxy)-4,5-benzo-1,3,2-dioxaphospholane

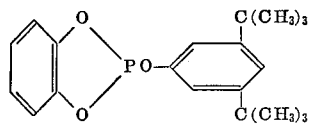

A 500 ml. flask was charged with 92.8 g. (0.45 mole) of 3,5-di-t-butylphenol. This was heated to 155° C. under $N_2$ and then 78.5 g. (0.45 mole) of 4,5-benzo-2-chloro-1,3,2-dioxaphospholane was added dropwise in 0.7 hour at 155–160° C. After heating one hour at 160° C., the mixture was cooled under vacuum and the residue distilled to give 139.1 g. (90% conversion) of clear, colorless product, B.P. 129–130° C., about 0.15 mm. having the following analysis.

Analysis.—Calc'd for $C_{20}H_{25}O_3P$ (percent): C, 69.8; H 7.3; P, 9.0. Found (percent): C, 69.8; H, 7.3; P, 9.1.

EXAMPLE XVII 2-(2,6-dimethylphenoxy)-4,5-benzo-1,3,2-dioxaphospholane

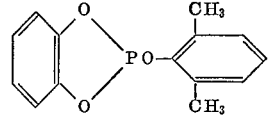

A 500 ml. flask was charged with 122.2 g. (1.0 mole) of 2,6-dimethylphenol. This was heated to 157° C. under $N_2$ and then 174.5 g. (1.0 mole) of 4,5-benzo-2-chloro-1,3,2-dioxphospholane was added dropwise in 0.9 hour at 155–165° C. The mixture was heated an additional hour at 160° C., cooled under vacuum and distilled to give 247.5 g. (95% conversion) of clear, colorless product, B.P. 92–92° C., about 0.15 mm., having the following analysis.

Analysis.—Calc'd for $C_{14}H_{13}O_3P$ (percent): C, 64.6; H, 5.0; P, 11.9. Found (percent): C, 64.6; H 5.0; P, 12.0.

EXAMPLE XVIII 2-(nonylphenoxy)-4,5-benzo-1,3,2-dioxaphospholane

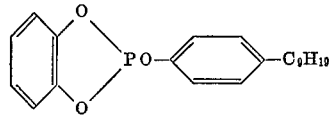

A 500 ml. flask was charged with 110.2 g. (0.5 mole) of nonylphenol. This was heated to 160° C. under $N_2$ and 87.3 g. (0.5 mole) of 4,5-benzo-2-chloro-1,3,2-dioxaphospholane was added dropwise in one hour at 160–170° C. The mixture was heated in this range an additional hour, cooled under vacuum, and distilled to give 4.0 g. of 4,5-benzo-2-chloro-1,3,2-dioxaphospholane (unreacted) and 152.6 g. (78% conversion) of clear, colorless liquid product, B.P. 152–153° C., about 0.15 mm.

EXAMPLE XIX 2-(2,4-di-t-butylphenoxy)-4,5-benzo-1,3,2-dioxaphospholane

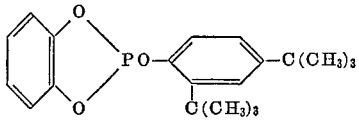

A 500 ml. flask was charged with 137.5 g. (0.67 mole) of 2,4-di-t-butylphenol. This was heated under $N_2$ to 160° C. and 116.4 g. (0.67 mole) of 4,5-benzo-2-chloro-1,3,2-dioxaphospholane was added dropwise in one hour at 155–162° C. After heating at 155–160° C. for 0.75 hour, the mixture was cooled under vacuum and distilled to give 199.1 g. (87% conversion) of clear, colorless product, B.P. 119–120° C., about 0.05 mm., having the following analysis:

*Analysis.*—Calc'd for $C_{20}H_{23}O_3P$ (percent): C, 69.7; H, 7.3; P, 9.00. Found (percent): C, 69.8; H, 7.4; P, 9.00.

It is to be understood that the specification, including the examples, are only illustrative of the invention claimed herein and that it is within the scope of this invention to employ equivalance obvious to one skilled in the art. Any limitations appearing in the preceding disclosure are not intended to limit this invention except insofar as the limitations are stated to be important or otherwise appear in the appended claims.

What is claimed:

1. A compound selected from the group consisting of

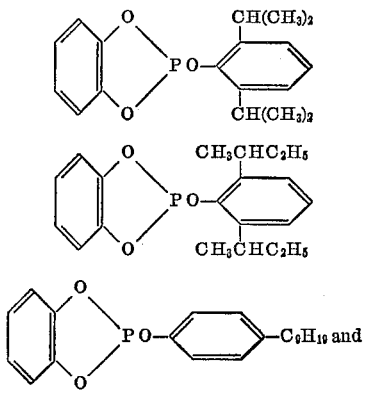

2. A compound of the formula

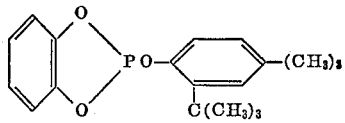

3. A compound of the formula

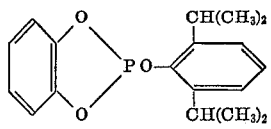

4. A compound of the formula

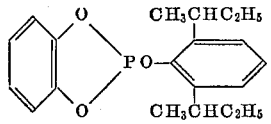

5. A compound of the formula

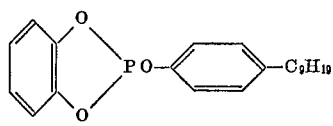

6. A compound of the formula

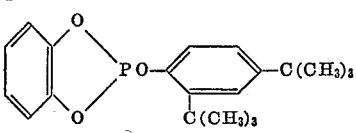

References Cited

UNITED STATES PATENTS 3,006,946  10/1961  Lanham _____ 260—973 X

FOREIGN PATENTS 1,461,139  10/1966  France _____ 260—937
1,126,039   9/1968  Great Britain _____ 260—937

OTHER REFERENCES

Kirpichnikov, et al., "Chem. Abstracts," vol. 63, (1965), p. 9844.

Anschutz et al., "Chemical Abstracts," vol. 26, 1932, p. 2437.

CHARLES B. PARKER, Primary Examiner

A. H. SUTTO, Assistant Examiner

U.S. Cl. X.R.

260—45.7 P, 45.95, 973